United States Patent
Hayashi et al.

(10) Patent No.: US 8,873,100 B2
(45) Date of Patent: Oct. 28, 2014

(54) IMAGE FORMING APPARATUS, METHOD OF CONTROLLING IMAGE FORMING APPARATUS, COMPUTER PROGRAM PRODUCT, AND IMAGE FORMING SYSTEM

(75) Inventors: Takahiko Hayashi, Tokyo (JP); Yumiko Murata, Tokyo (JP); Daisuke Noguchi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 924 days.

(21) Appl. No.: 12/923,214

(22) Filed: Sep. 9, 2010

(65) Prior Publication Data
US 2011/0063688 A1  Mar. 17, 2011

(30) Foreign Application Priority Data

Sep. 14, 2009 (JP) ................................. 2009-211193
Aug. 17, 2010 (JP) ................................. 2010-182523

(51) Int. Cl.
| | |
|---|---|
| *G06K 15/00* | (2006.01) |
| *G06F 3/12* | (2006.01) |
| *G03G 21/02* | (2006.01) |
| *G03G 15/00* | (2006.01) |
| *H04N 1/44* | (2006.01) |
| *H04N 1/00* | (2006.01) |

(52) U.S. Cl.
CPC ......... *H04N 1/00413* (2013.01); *H04N 1/4413* (2013.01); *H04N 2201/0039* (2013.01); *H04N 2201/0094* (2013.01); *H04N 1/00424* (2013.01); *H04N 1/0048* (2013.01); *G03G 2215/00109* (2013.01); *H04N 1/00514* (2013.01); *H04N 1/00474* (2013.01); *H04N 1/00204* (2013.01); *G03G 15/502* (2013.01); *H04N 1/4433* (2013.01)

USPC ....... 358/1.18; 358/1.13; 358/1.15; 358/1.16; 399/79; 399/80; 399/81

(58) Field of Classification Search
USPC ........ 358/442, 1.18, 1.13, 1.15, 1.16; 399/79, 399/80, 81
See application file for complete search history.

(56) References Cited

U.S. PATENT DOCUMENTS

2006/0198653 A1*  9/2006  Plewnia et al. ................. 399/79

FOREIGN PATENT DOCUMENTS

| JP | 3696916 | 7/2005 |
|---|---|---|
| JP | 2006-222941 | 8/2006 |

OTHER PUBLICATIONS

English Language Abstract of Japan Patent Publication No. JP 08-234991.

* cited by examiner

*Primary Examiner* — Charlotte M Baker
(74) *Attorney, Agent, or Firm* — Harness, Dickey & Pierce, P.L.C.

(57) ABSTRACT

An image forming apparatus includes: a storage unit configured to store therein a plurality of function setting items; a display unit configured to display the function setting items stored in the storage unit; a selecting unit configured to select one or more function setting items to be displayed on the display unit from the function setting items stored in the storage unit based on a selecting condition for selecting the function setting items to be displayed on the display unit; and a control unit configured to select, when a single function setting item is selected by the selecting unit, the single function setting item as a function setting item to be executed by the image forming apparatus.

11 Claims, 13 Drawing Sheets

FIG. 2

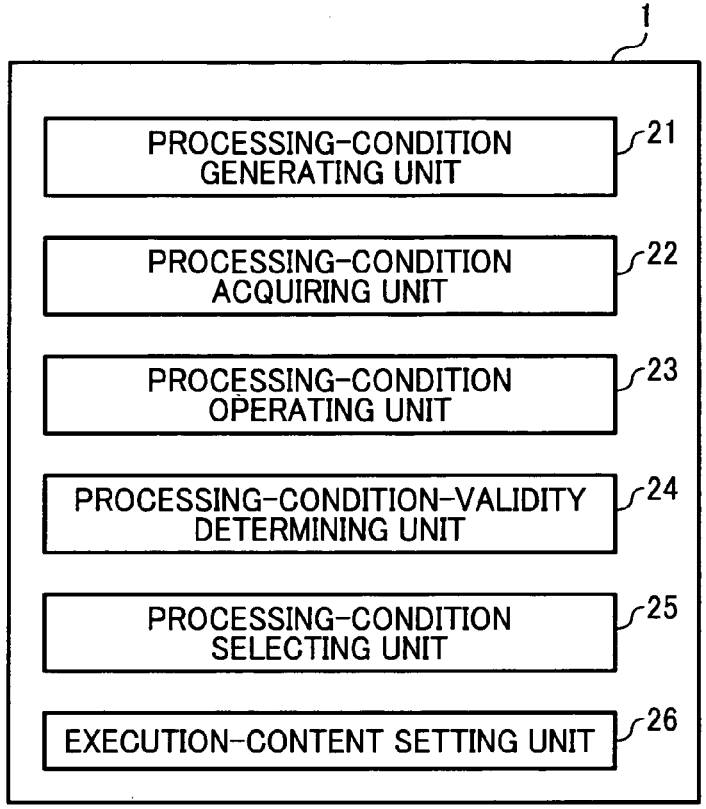

- PROCESSING-CONDITION GENERATING UNIT — 21
- PROCESSING-CONDITION ACQUIRING UNIT — 22
- PROCESSING-CONDITION OPERATING UNIT — 23
- PROCESSING-CONDITION-VALIDITY DETERMINING UNIT — 24
- PROCESSING-CONDITION SELECTING UNIT — 25
- EXECUTION-CONTENT SETTING UNIT — 26

FIG. 3

| PSP NUMBER | DETAILS | |
|---|---|---|
| 1 | SCANNING CONDITION | SCANNING TICKET 1 |
| | TRANSMISSION METHOD | FOLDER TRANSMISSION |
| | TRANSMISSION DESTINATION | FOLDER 1 |
| 2 | SCANNING CONDITION | SCANNING TICKET 2 |
| | TRANSMISSION METHOD | FOLDER TRANSMISSION |
| | TRANSMISSION DESTINATION | FOLDER 1 |
| 3 | SCANNING CONDITION | SCANNING TICKET 3 |
| | TRANSMISSION METHOD | FOLDER TRANSMISSION |
| | TRANSMISSION DESTINATION | FOLDER 2 |

FIG. 4

| JOB SUMMARY | JOB NAME | | | SCANNING TICKET 1 | |
|---|---|---|---|---|---|
| | NAME OF PERSON WHO REGISTERED JOB | | | taka | |
| | JOB INFORMATION | | | JOB CREATED AT FRONT PANEL | |
| DOCUMENT CONDITION | FORMAT | | | jpeg | |
| | COMPRESSION RATIO | | | 35 | |
| | NUMBER OF READ IMAGES | | | 3333 | |
| | DEVICE TO BE USED | | | PLATEN | |
| | INPUT SIZE | | | AUTO DETECTION | |
| | BRIGHTNESS | | | AUTO BACKGROUND REMOVAL | |
| | MEDIA | RANGE | X OFFSET | 250 | |
| | | | Y OFFSET | 250 | |
| | | | WIDTH | 4000 | |
| | | | LENGTH | 6000 | |
| | | COLOR PROCESSING | | RGB 24 | |
| | | RESOLUTION | | 1200 dpi | |

FIG. 5

| DEVICE NAME | AVAILABILITY |
|---|---|
| PLATEN | AVAILABLE |
| ADF | UNAVAILABLE |
| ... | ... |

FIG. 6

| PLUG-IN | AVAILABLE FORMAT |
|---|---|
| ssss.jar | JPEG |
| dee.jar | PDF |
| ... | ... |

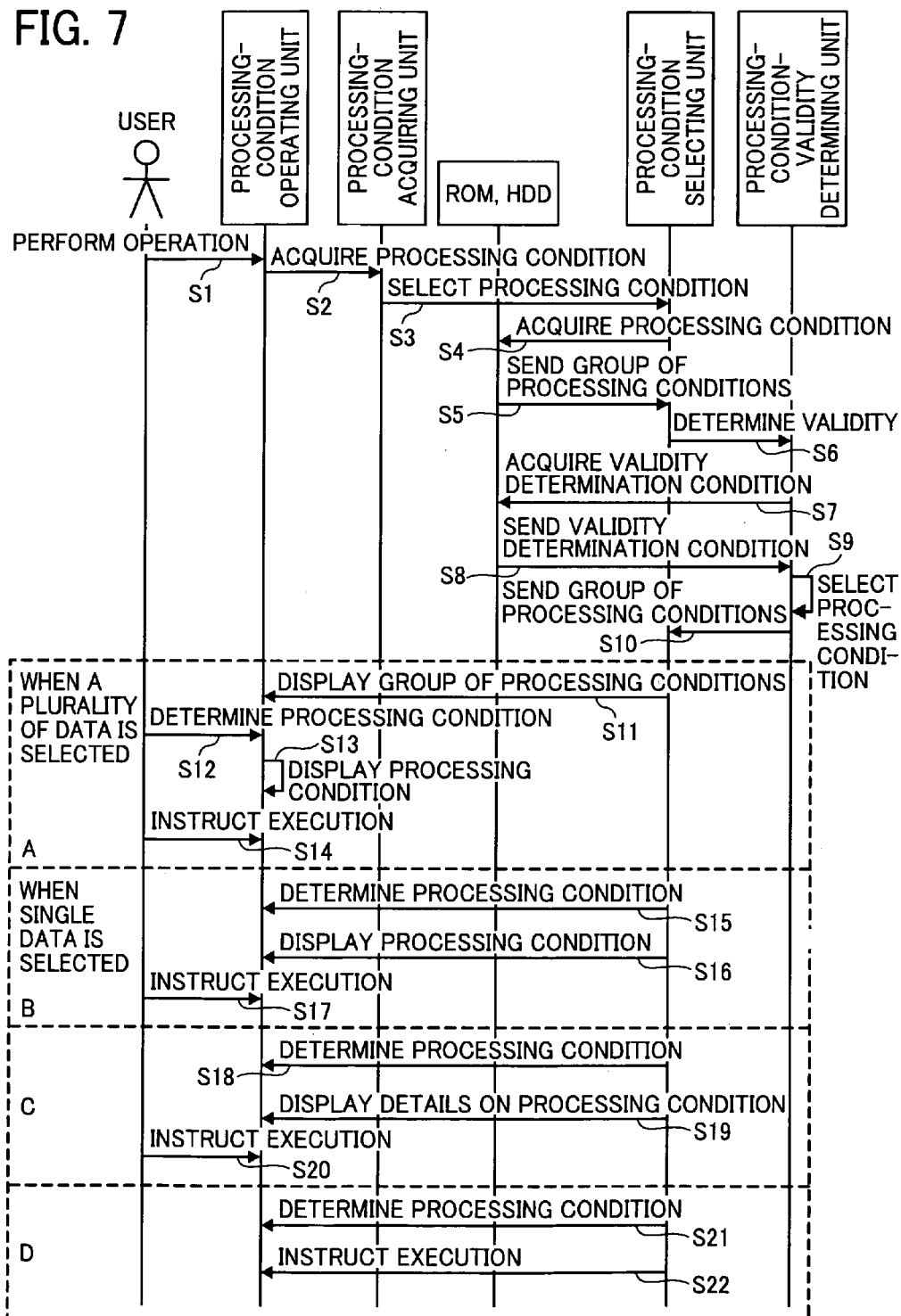

| USER NAME | user1 |
|---|---|
| PASSWORD | piyopiyopi |
| TRANSMISSION SOURCE ADDRESS | mame@dddd··· |
| AVAILABLE PROCESSING NUMBER | 1, 2, 4, 6 |

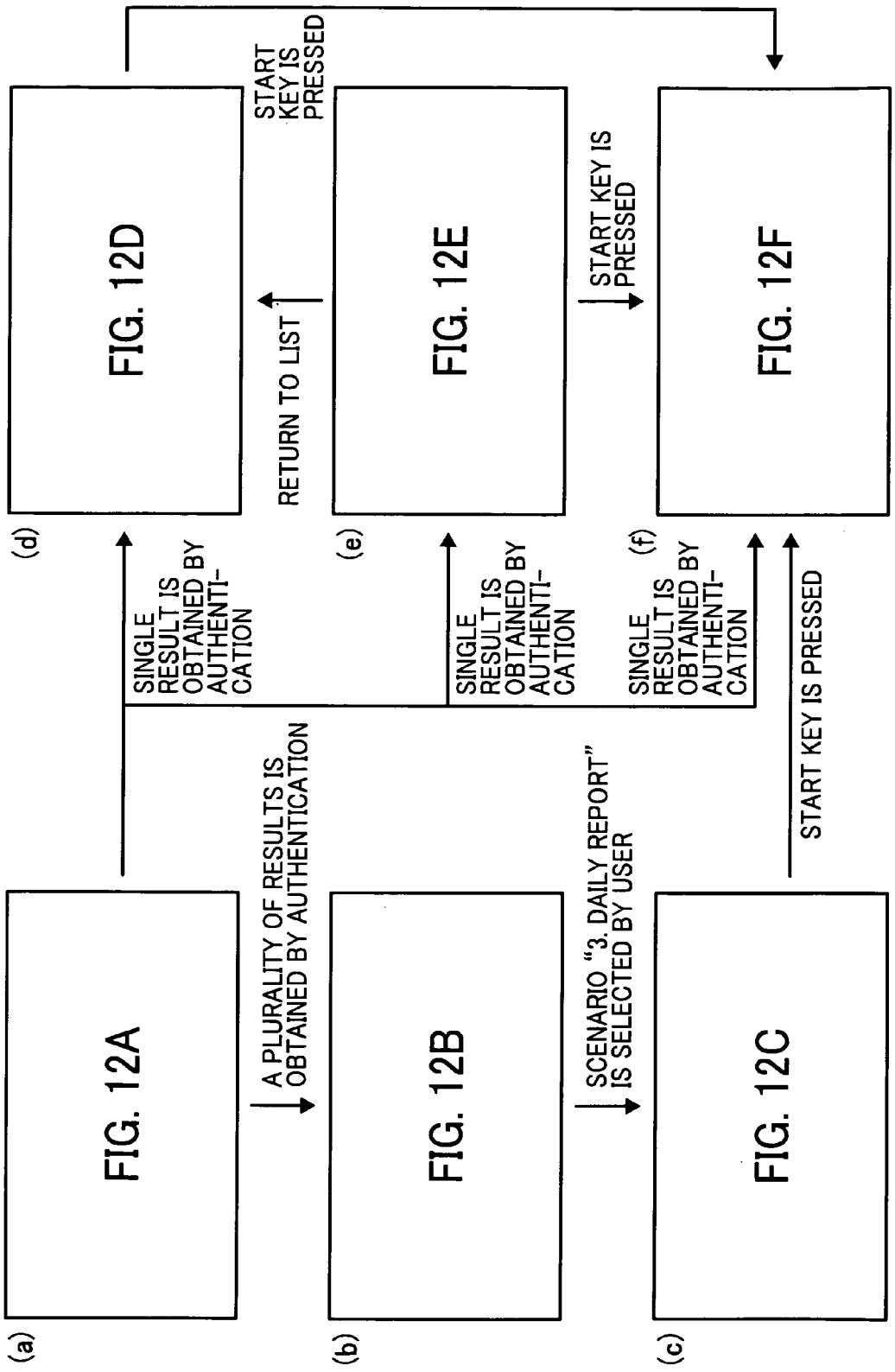

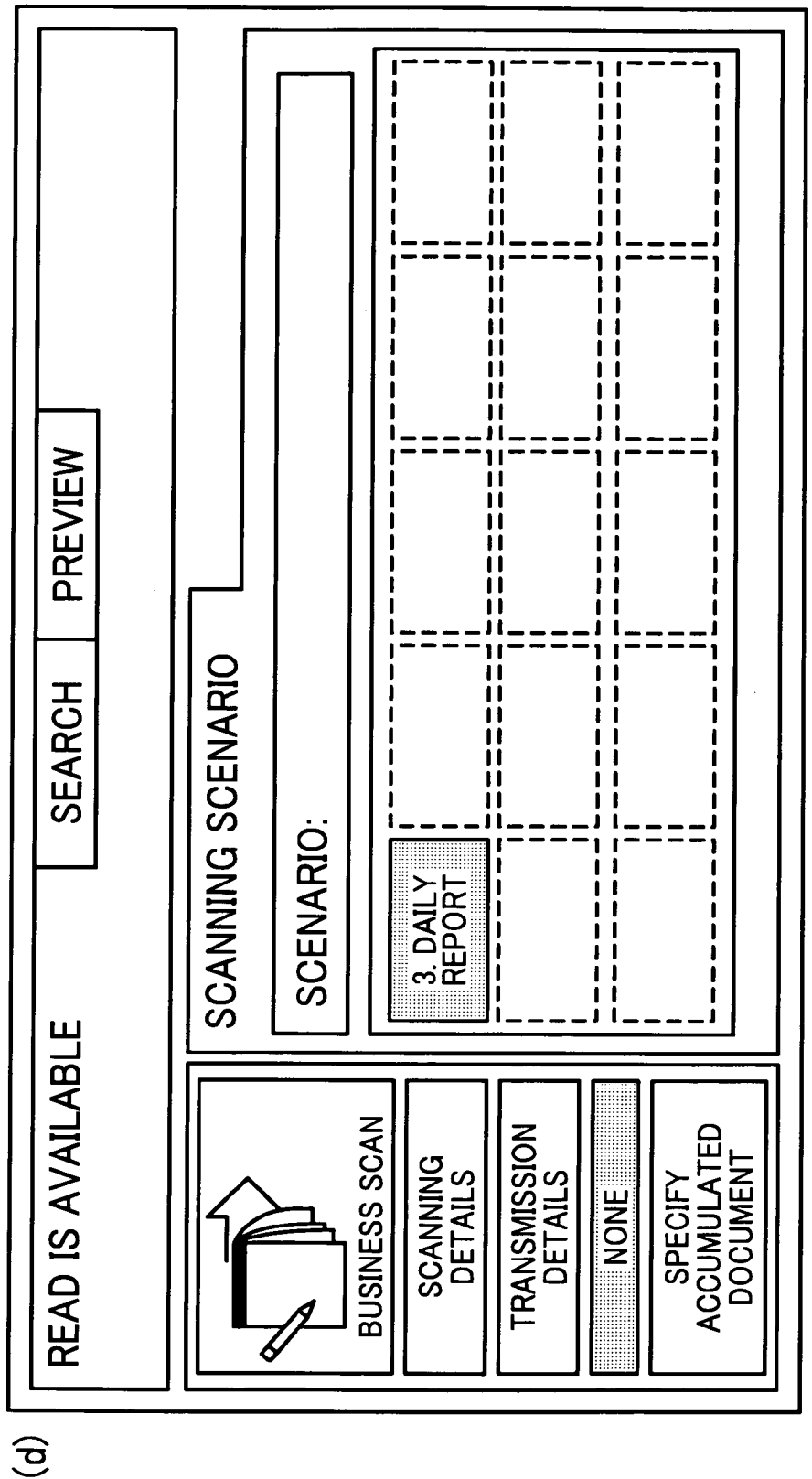

FIG. 12E (e)

| READ IS AVAILABLE | SEARCH | PREVIEW |

■SCENARIO "3. DAILY REPORT" IS SELECTED
PRESS START KEY IF THIS IS OK

【ORIGINAL TYPE】　　　　【SIZE】
CHARACTER　　　　　　　AUTOMATIC DETECTION
【RESOLUTION】
400 dpi
【COLOR MODE】　　　　　【TRANSMISSION DESTINATION】
BLACK AND WHITE　　　　hiyoko@piyopiyo..
【FILE TYPE】
PDF

RETURN

FIG. 12F (f)

| READ IS AVAILABLE | SEARCH | PREVIEW |

□SCENARIO "3. DAILY REPORT" IS BEING EXECUTED

【ORIGINAL TYPE】　　　　【SIZE】
CHARACTER　　　　　　　AUTOMATIC DETECTION
【RESOLUTION】
400 dpi
【COLOR MODE】　　　　　【TRANSMISSION DESTINATION】
BLACK AND WHITE　　　　hiyoko@piyopiyo..
【FILE TYPE】
PDF

RETURN

IMAGE FORMING APPARATUS, METHOD OF CONTROLLING IMAGE FORMING APPARATUS, COMPUTER PROGRAM PRODUCT, AND IMAGE FORMING SYSTEM

CROSS-REFERENCE TO RELATED APPLICATIONS

The present application claims priority to and incorporates by reference the entire contents of Japanese Patent Application No. 2009-211193 filed in Japan on Sep. 14, 2009 and Japanese Patent Application No. 2010-182523 filed in Japan on Aug. 17, 2010.

BACKGROUND OF THE INVENTION

1. Field of the Invention

The present invention relates to an image forming apparatus, a method of controlling the image forming apparatus, a computer program product, and an image forming system.

2. Description of the Related Art

Conventionally, image forming apparatuses have been used, such as a scanner that reads an image of an original, a copier that prints an image of an original read by a scanner, a printer and a facsimile machine that print an image of an original input from an external apparatus, and a so-called multifunction peripheral (MFP) having functions of the above devices. In these image forming apparatuses, when execution of image forming operation is to be instructed, it is necessary to perform various function settings, for example, a setting related to the state of an original such as a type or density of the original, a setting related to various image processing such as an enlargement/reduction ratio, a one-sided/two-sided setting, or a margin size, and a setting related to finishing processing such as sorting, stapling, or punching. Therefore, when instructing the execution of image forming operation in these image forming apparatuses, a user needs to perform operation of selecting a desired function setting item from a list of the enormous number of function setting items, which is laborious.

To cope with the situation as described above, in recent years, there has been proposed an image forming apparatus that can register a desired function setting item in advance. In such an image forming apparatus, a user selects a desired function setting item from a list of pre-registered function setting items, checks the contents of the selected function setting item, and then instructs the image forming apparatus to execute image forming operation according to the selected function setting item. With such an image forming apparatus, because it is not necessary for the user to search for a desired function setting item from the list of the enormous number of function setting items contained in the image forming apparatus, the user's labor can be reduced (see, for example, Japanese Patent No. 3696916 and Japanese Patent Application Laid-open No. 2006-222941).

However, according to the conventional image forming apparatus, even when the user has registered only a single function setting item, the user is required to perform operation of selecting the function setting item that the user has registered by searching through a list of function setting items including function setting items registered by other users. That is, in the conventional image forming apparatus, even when the user has registered only a single function setting item, the user is not allowed to instruct the image forming apparatus to execute the image forming operation according to a desired function setting item unless the user performs the operation of selecting the function setting item from the list and checking the contents of the selected function setting item. Therefore, with the conventional image forming apparatus, it is sometimes difficult to reduce the user's labor.

SUMMARY OF THE INVENTION

It is an object of the present invention to at least partially solve the problems in the conventional technology.

According to the present invention, there is provided an image forming apparatus including: a storage unit configured to store therein a plurality of function setting items; a display unit configured to display the function setting items stored in the storage unit; a selecting unit configured to select one or more function setting items to be displayed on the display unit from the function setting items stored in the storage unit based on a selecting condition for selecting the function setting items to be displayed on the display unit; and a control unit configured to select, when a single function setting item is selected by the selecting unit, the single function setting item as a function setting item to be executed by the image forming apparatus.

According to another aspect of the present invention, there is provided a method of controlling an image forming apparatus including: displaying a plurality of function setting items stored in a storage unit on a display unit; selecting one or more function setting items to be displayed on the display unit from the function setting items stored in the storage unit based on a selecting condition for selecting function setting items to be displayed on the display unit; and controlling to select, when a single function setting item is selected at the selecting, the single function setting item as a function setting item to be executed by the image forming apparatus.

According to still another aspect of the present invention, there is provided a computer program product comprising a computer usable medium having computer readable program codes embodied in the medium that, when executed, causes a computer to execute: displaying a plurality of function setting items stored in a storage unit on a display unit; selecting one or more function setting items to be displayed on the display unit from the function setting items stored in the storage unit based on a selecting condition for selecting function setting items to be displayed on the display unit; and controlling to select, when a single function setting item is selected at the selecting, the single function setting item as a function setting item to be executed by the image forming apparatus.

According to still another aspect of the present invention, there is provided an image forming system including: an image forming apparatus; and an information processing apparatus connected to the image forming apparatus via an electrical communication line, wherein the information processing apparatus includes a storage unit configured to store therein a plurality of function setting items to be executed by the image forming apparatus, and the image forming apparatus includes a display unit configured to display the function setting items stored in the storage unit; a selecting unit configured to select one or more function setting items to be displayed on the display unit from the function setting items stored in the storage unit based on a selecting condition for selecting function setting items to be displayed on the display unit; and a control unit configured to select, when a single function setting item is selected by the selecting unit, the single function setting item as a function setting item to be executed by the image forming apparatus.

The above and other objects, features, advantages and technical and industrial significance of this invention will be better understood by reading the following detailed descrip-

BRIEF DESCRIPTION OF THE DRAWINGS

FIG. 2 is a functional block diagram of the image forming apparatus in the embodiment;

FIG. 3 is a diagram illustrating an example of processing condition data in the embodiment;

FIG. 4 is a diagram illustrating an example of scanning condition data illustrated in FIG. 3;

FIG. 5 is a diagram illustrating an example of device-configuration determination condition data in the embodiment;

FIG. 6 is a diagram illustrating an example of functional-configuration determination condition data in the embodiment;

FIG. 7 is a timing diagram illustrating a flow of a processing condition determination process in the embodiment;

FIG. 12 is a screen transition diagram illustrating a flow of a processing condition display process in the embodiment.

FIGS. 12A to 12F are diagrams illustrating details of screens illustrated in FIG. 12.

DETAILED DESCRIPTION OF THE PREFERRED EMBODIMENTS

Exemplary embodiments of the present invention are explained in detail below with reference to the accompanying drawings.

First Embodiment

The configuration and operation of an image forming apparatus according to a first embodiment of the present invention are described below with reference to FIGS. 1 to 9.

(Configuration of the Image Forming Apparatus)

Figure 1:
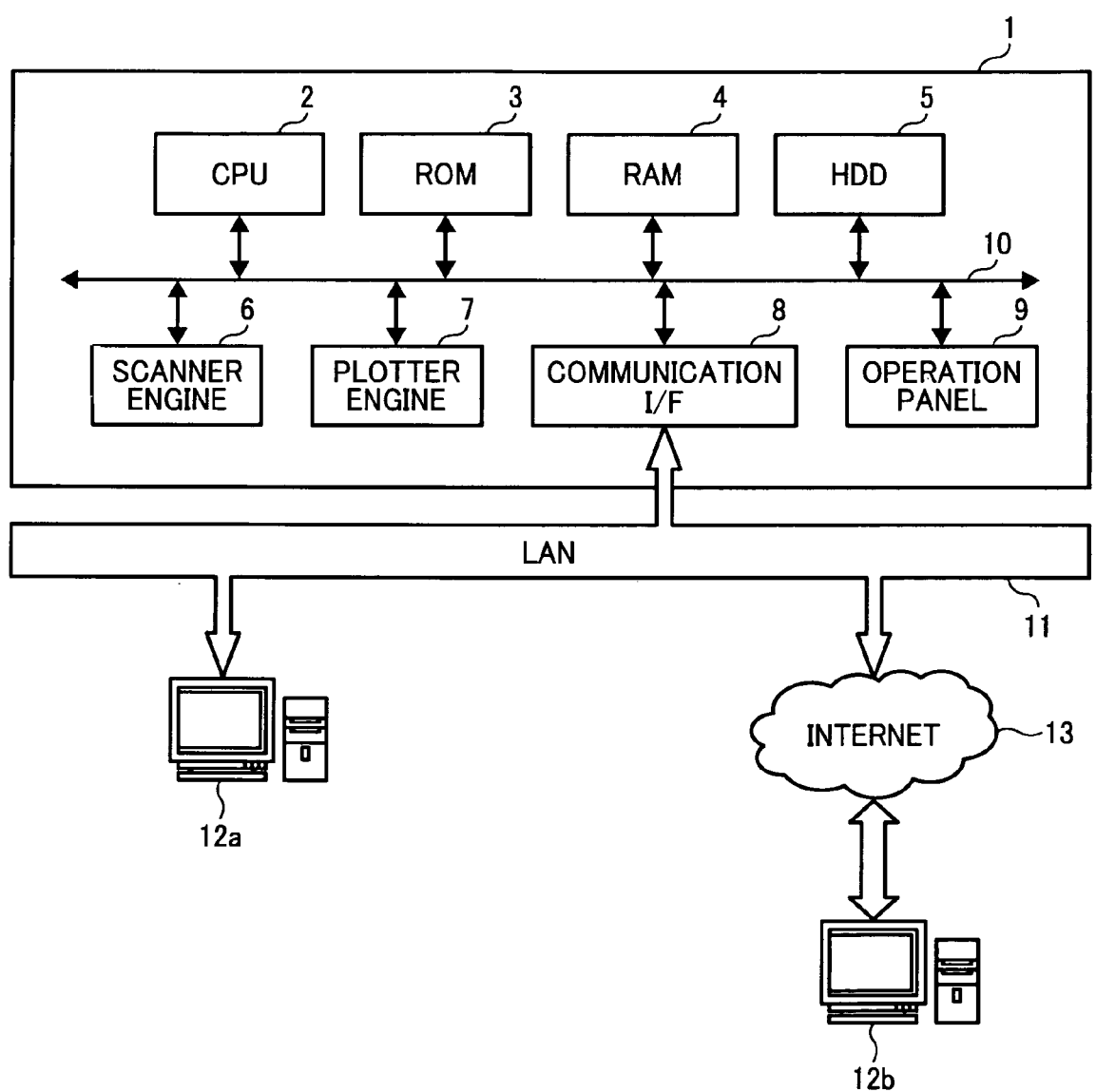
FIG. 1 is a block diagram of an image forming apparatus according to an embodiment of the present invention.

As illustrated in FIG. 1, an image forming apparatus 1 according to the first embodiment includes, as main components, a CPU (Central Processing Unit) 2, a ROM (Read Only Memory) 3, a RAM (Random Access Memory) 4, an HDD (Hard Disk Drive) 5, a scanner engine 6, a plotter engine 7, a communication interface (I/F) 8, and an operation panel 9. These components are connected to one another via an internal bus wiring 10.

The CPU 2 performs overall control on the whole image forming apparatus 1. The CPU 2 executes computer programs stored in the ROM 3 or the HDD 5 to thereby function as a processing-condition generating unit 21, a processing-condition acquiring unit 22, a processing-condition operating unit 23, a processing-condition-validity determining unit 24, a processing-condition selecting unit 25, and an execution-content setting unit 26 as illustrated in FIG. 2. The functions (operation) of the above units will be described later. The CPU 2 functions as a selecting unit and a control unit.

The ROM 3 is constructed of a nonvolatile storage device for storing computer programs to be executed by the CPU 2, fixed data, parameters, or the like. The ROM 3 may be constructed of a rewritable storage device so that information stored in the ROM 3 can be updated. The RAM 4 is constructed of a volatile storage device for temporarily storing data or functioning as a work area of the CPU 2.

The HDD 5 stores therein computer programs to be executed by the CPU 2, data and parameters that are needed to be stored even after the power of the image forming apparatus is turned off, image data read by the scanner engine 6, data received from an external apparatus via the communication I/F 8, or the like. It is possible to use other storage devices, such as a flash memory, instead of the ROM 3 and the HDD 5. The ROM 3 and the HDD 5 function as storage unit.

The scanner engine 6 controls a scanner device that acquires image data of an original which is placed on a platen or which is fed to an image reading unit by an auto document feeder (ADF). The plotter engine 7 controls a plotter device that prints out image data acquired by the scanner engine 6 or image data acquired from an external apparatus via the communication I/F 8. The communication I/F 8 controls information communication with external information processing apparatuses 12a and 12b via a LAN (Local Area Network) 11 or the Internet 13.

The operation panel 9 includes a display unit for displaying function setting keys, the number of copies, and messages indicating the state of the image forming apparatus 1, and an operation input unit for receiving key input using a numerical key, a clear/stop key, a start key, a preheat key, a reset key, an initial setting key, a print key, a transmission key, a save key, or the like. The display unit also functions as an operation input unit that can not only display an image but also receive input of operation with a touch panel system. The operation panel 9 functions as a display unit.

(Processing Condition Data)

As illustrated in FIG. 3, the ROM 3 or the HDD 5 stores therein a plurality of pieces of processing condition data indicating function setting items related to the operations of the image forming apparatus 1 with unique identification information (PSP number) assigned to each processing condition data. Each processing condition data illustrated in FIG. 3 indicates a function setting item related to the operation of the scanner engine 6, and includes pieces of data related to a scanning condition name, a method of transmitting acquired image data, and a transmission destination.

The scanning condition name illustrated in FIG. 3 is associated with scanning condition data having a data structure as illustrated in FIG. 4. The scanning condition data illustrated in FIG. 4 is formed of job summary information containing information on a job name, a name of a person who has registered a job, and the like, and document condition data containing an image-data reading method such as a device to be used, an image-data processing method such as an output format, and the like.

The above information is stored in the ROM 3 or the HDD 5 by being registered in advance through registration operation by a user via the operation panel 9 or by being received via the LAN 11 or the Internet 13. Although the processing condition data illustrated in FIG. 3 indicates the function setting items related to the operations of the scanner engine 6, it is possible to set and store similar processing condition data related to the operations of the plotter engine 7 or data communication operation performed via the communication I/F 8.

(Device-Configuration Determination Condition Data)

The ROM 3 or the HDD 5 stores therein device-configuration determination condition data indicating a device configuration of the image forming apparatus 1 as illustrated in FIG. 5. The device-configuration determination condition data illustrated in FIG. 5 includes information indicating availability or unavailability of each device (a platen, an ADF, and the like) included in the image forming apparatus 1.

(Functional-Configuration Determination Condition Data)

The ROM 3 or the HDD 5 stores therein functional-configuration determination condition data indicating a functional configuration of the image forming apparatus 1 as illustrated in FIG. 6. The functional-configuration determination condition data illustrated in FIG. 6 includes information indicating an image data format (JPEG (Joint Photographic Experts Group), PDF (Portable Document Format), and the like) that can be handled by a plug-in program installed in the image forming apparatus 1. The plug-in program means software that is not installed in the image forming apparatus 1 in the initial state and is developed or installed by a user according to a need.

(Processing Condition Determination Process)

The image forming apparatus 1 having the above configuration executes a processing condition determination process as described below, so that it is possible to reduce the user's labor for instructing the execution of image forming operation in accordance with a function setting item. A flow of the operations performed by the image forming apparatus 1 for executing the processing condition determination process is described below with reference to a timing diagram illustrated in FIG. 7.

In the timing diagram illustrated in FIG. 7, the process starts at a timing at which a user inputs an instruction to display a function setting item by operating the operation panel 9 in the process at Step S1, and the processing condition determination process proceeds to Step S2.

In the process at Step S2, the CPU 2 functions as the processing-condition operating unit 23 to instruct the processing-condition acquiring unit 22 to acquire processing condition data. Accordingly, the process at Step S2 is completed, and the processing condition determination process proceeds to Step S3.

In the process at Step S3, the CPU 2 functions as the processing-condition acquiring unit 22 to request the processing-condition selecting unit 25 to select the processing condition data. Accordingly, the process at Step S3 is completed, and the processing condition determination process proceeds to Step S4.

In the process at Step S4, the CPU 2 functions as the processing-condition selecting unit 25 to issue a request for acquiring the processing condition data to the ROM 3 or the HDD 5. Accordingly, the process at Step S4 is completed, and the processing condition determination process proceeds to Step S5.

In the process at Step S5, the ROM 3 or the HDD 5 sends the processing condition data to the RAM 4. Accordingly, the process at Step S5 is completed, and the processing condition determination process proceeds to Step S6.

In the process at Step S6, the CPU 2 functions as the processing-condition selecting unit 25 to request the processing-condition-validity determining unit 24 to select the processing condition data based on the device-configuration determination condition data illustrated in FIG. 5 and the functional-configuration determination condition data illustrated in FIG. 6 (these are validity determination condition data). Accordingly, the process at Step S6 is completed, and the processing condition determination process proceeds to Step S7.

In the process at Step S7, the CPU 2 functions as the processing-condition-validity determining unit 24 to issue a request for acquiring the validity determination condition data stored in the ROM 3 or the HDD 5. Accordingly, the process at Step S7 is completed, and the processing condition determination process proceeds to Step S8.

In the process at Step S8, the ROM 3 or the HDD 5 sends the validity determination condition data to the RAM 4. Accordingly, the process at Step S8 is completed, and the processing condition determination process proceeds to at Step S9.

In the process at Step S9, the CPU 2 functions as the processing-condition-validity determining unit 24 to select the processing condition data stored in the RAM 4 based on the validity determination condition data sent to the RAM 4. More specifically, when the processing condition data indicating use of a platen and the processing condition data indicating use of an ADF are stored in the RAM 4, and if the device-configuration determination condition data is the data illustrated in FIG. 5, the CPU 2 selects the processing condition data indicating use of the platen from the pieces of processing condition data because the ADF is not available. When the image data format set as available in the functional-configuration determination condition data is JPEG, it is desirable for the CPU 2 to analyze the image data of an original acquired by the scanner engine 6 (and performs character specification if necessary) based on the document condition data (a format, a compression ratio, the number of read images, and the like) contained in the processing condition data, and determine whether the format of the image data is JPEG or not based on the analysis result. In this case, when software having the enormous number of function setting items is applied as the plug-in program, it is possible for the CPU 2 to select the processing condition data based on whether the image data of the original acquired by the scanner engine 6 uses the plug-in program or not. Accordingly, the process at Step S9 is completed, and the processing condition determination process proceeds to Step S10.

In the process at Step S10, the CPU 2 functions as the processing-condition-validity determining unit 24 to notify the processing-condition selecting unit 25 of the processing condition data selected in the process at Step S9. Accordingly, the process at Step S13 is completed. The subsequent processing condition determination process is explained below in two cases, in one of which a plurality of pieces of processing condition data is selected and in the other of which only a single piece of processing condition data is selected.

(When a Plurality of Pieces of Processing Condition Data is Selected)

When a plurality of pieces of processing condition data is selected (phase A), the CPU 2 firstly functions as the processing-condition operating unit 23 to control the display unit of the operation panel 9 to display the pieces of selected processing condition data (Step S11). Then, the CPU 2 functions as the processing-condition operating unit 23 at a timing at which a user selects an arbitrary piece of processing condition data from among the displayed pieces of processing condition data (Step S12), so that the CPU 2 controls the display unit of the operation panel 9 to display detailed information on the selected piece of processing condition data (Step S13). Then, the CPU 2 starts performing processing control on devices at a timing at which the user instructs the execution of the operation based on the processing condition data (Step S14).

(When a Single Piece of Processing Condition Data is Selected)

When a single piece of processing condition data is selected (phase B), the CPU 2 firstly function as the processing-condition selecting unit 25 to determine the selected processing condition data as a processing condition to be used in the subsequent processes (Step S15), and then functions as the processing-condition operating unit 23 to control the display unit of the operation panel 9 to display the determined processing condition data (Step S16). Then, the CPU 2 starts performing the processing control on the devices at a timing at which the user instructs the execution of the operation based on the processing condition (Step S17).

In the operation in the phase B described above, the CPU 2 displays only the processing condition on the display unit of the operation panel 9. However, it is possible to display detailed information on the processing condition on the display unit of the operation panel 9 (phase C). More specifically, in this case, the CPU 2 firstly functions as the processing-condition selecting unit 25 to determine the selected processing condition data as a processing condition to be used in the subsequent processes (Step S18), and then functions as the processing-condition operating unit 23 to control the display unit of the operation panel 9 to display the details of the determined processing condition (Step S19). Then, the CPU 2 starts performing the processing control on the devices at a timing at which the user instructs the execution of the operation based on the processing condition (Step S20).

In the operation in the phases B and C, the CPU 2 starts performing the processing control on the devices at a timing at which the user instructs the execution of the operation based on the processing condition. However, it is possible to start performing the processing control on the devices at a timing at which the processing condition is selected without requesting the user to give the instruction (phase D). More specifically, in this case, the CPU 2 firstly functions as the processing-condition selecting unit 25 to determine the selected processing condition data as a processing condition to be used in the subsequent processes (Step S21), and then continuously functions as the processing-condition selecting unit 25 to start performing the processing control on the devices based on the determined processing condition (Step S22).

Figure 8:
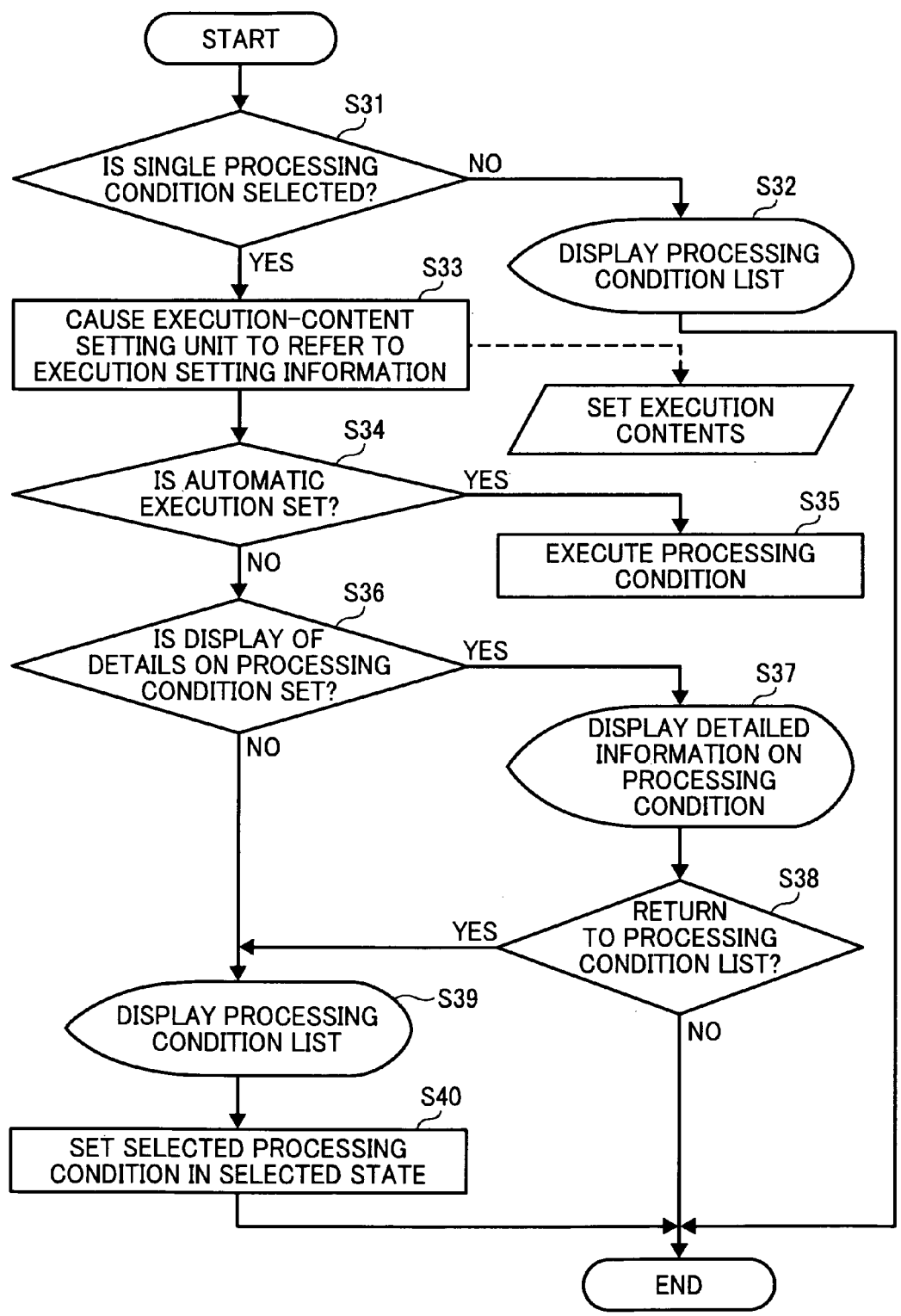
FIG. 8 is a flowchart illustrating a flow of the processing condition determination process in the embodiment.

FIG. 8 is a flowchart of a flow of the processing condition determination process after the processing condition data is selected as described above. In the flowchart illustrated in FIG. 8, the process starts at a timing at which the selecting of the processing condition (the process at Step S10) is completed, and the processing condition determination process proceeds to Step S31.

In the process at Step S31, the CPU 2 determines whether a single piece of processing condition data has been selected by the selecting or not. When it is determined that a single piece of processing condition data has been selected by the selecting, the CPU 2 controls the processing condition determination to proceed to Step S33. On the other hand, when a plurality of pieces of processing condition data is selected by the selecting, the CPU 2 causes the processing condition determination process to proceed to Step S32.

In the process at Step S32, the CPU 2 controls the display unit of the operation panel 9 to display a list of the pieces of selected processing condition data. Accordingly, the process at Step S32 is completed, and the processing condition determination process ends.

Figures 9, 10:
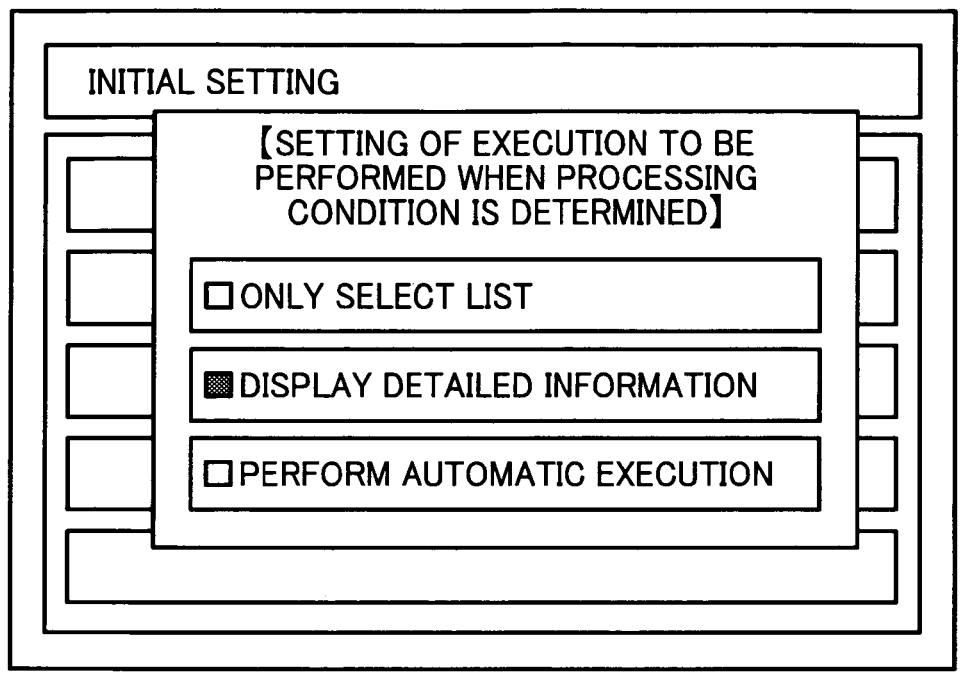
FIG. 9 is a diagram illustrating an example of a screen for setting a process to be executed when a processing condition is determined in the embodiment.
FIG. 10 is a diagram illustrating an example of user authentication information according to a second embodiment of the present invention.

In the process at Step S33, the CPU 2 functions as the execution-content setting unit 26 to refer to a content of a processing that is set in advance as a process to be executed when the processing condition is determined. More specifically, the CPU 2 refers to a process (e.g., "display of a list of processing condition data, "display of detailed information on processing condition data", or "automatic execution of the process based on the processing condition data")) which is set by a user via an initial setting screen as illustrated in FIG. 9 as a process to be executed when a single piece of processing condition data is obtained by the selecting. Accordingly, the process at Step S33 is completed, and the processing condition determination process proceeds to Step S34.

In the process at Step S34, the CPU 2 determines whether automatic execution of the process is set or not based on the execution content referred to by the process at Step S33. When it is determined that the automatic execution of the process is set, the CPU 2 causes the processing condition determination process to proceed to Step S35. On the other hand, when the automatic execution of the process is not set, the CPU 2 causes the processing condition determination process to proceed to Step S36.

In the process at Step S35, the CPU 2 starts performing the processing control on the devices based on the selected processing condition data. Accordingly, the process at Step S35 is completed, and the processing condition determination process ends.

In the process at Step S36, the CPU 2 determines whether display of detailed information on the processing condition data has been set or not. When it is determined that the display of the detailed information on the processing condition data has been set, the CPU 2 causes the processing condition determination process to proceed to Step S37. On the other hand, when the display of the detailed information on the processing condition data has not been set, the CPU 2 causes the processing condition determination process to proceed to Step S39.

In the process at Step S37, the CPU 2 controls the display unit of the operation panel 9 to display the detailed information on the selected processing condition data. Accordingly, the process at Step S37 is completed, and the processing condition determination process proceeds to Step S38.

In the process at Step S38, the CPU 2 determines whether the user has given an instruction to display a list of the processing condition data or not. When it is determined that the display of the processing condition list has been instructed, the CPU 2 causes the processing condition determination process to proceed to Step S39. On the other hand, when the display of the processing condition list has not been instructed, the CPU 2 ends the processing condition determination process.

In the process at Step S39, the CPU 2 controls the display unit of the operation panel 9 to display the list of the processing condition data. Accordingly, the process at Step S39 is completed, and the processing condition determination process proceeds to Step S40.

In the process at Step S40, the CPU 2 displays a selection screen for selecting the processing condition data selected at the selecting of the processing condition data. Accordingly, the process at Step S40 is completed, and the processing condition determination process ends.

As apparent from the above descriptions, according to the image forming apparatus 1 of the first embodiment, the CPU 2 selects the processing condition to be displayed on the display unit of the operation panel 9 based on the validity determination condition (the device-configuration determination condition and the functional-configuration determination condition). Then, when a single processing condition is selected, the CPU 2 automatically selects the processing condition as a processing condition to be used in the subsequent processes. Therefore, it is possible to reduce the user's labor for instructing the execution of image forming operation in accordance with the function setting item.

Furthermore, according to the image forming apparatus 1 of the first embodiment, when a single processing condition is selected, the CPU 2 displays the detailed information on the selected processing condition. Therefore, user operation for displaying the detailed information on the processing condition is not needed. As a result, it is possible to reduce the user's labor for instructing the execution of image forming operation in accordance with the function setting item.

Moreover, according to the image forming apparatus 1 of the first embodiment, when a single processing condition is selected, the CPU 2 controls devices to start operation in accordance with the selected processing condition. Therefore, user operation for giving an instruction to start operation in accordance with the processing condition is not needed. As a result, it is possible to reduce the user's labor for instructing the execution of image forming operation in accordance with the function setting item.

Second Embodiment

The configuration and operation of an image forming apparatus according to a second embodiment of the present invention are described below with reference to FIGS. 10 to 12.

(Configuration of the Image Forming Apparatus)

The image forming apparatus according to the second embodiment is configured such that the storage device for storing the processing condition data and the validity determination condition data and the processing-condition-validity determining unit 24 are arranged on the terminal devices (information processing apparatuses) 12a and 12b side connected to the image forming apparatus 1 via the LAN 11 or the Internet 13. Furthermore, in the present embodiment, the validity determination condition data includes authentication information data for authenticating a user as illustrated in FIG. 10. The authentication information data illustrated in FIG. 10 includes a user name, a password, an e-mail address, and an identification number (a PSP number or an available processing number) assigned to processing condition data that the user is allowed to execute.

(Processing Condition Determination Process)

The image forming apparatus having the above configuration executes the processing condition determination process described below, so that it is possible to reduce the user's labor for instructing the execution of image forming operation in accordance with a function setting item. A flow of the operations performed by the image forming apparatus for executing the processing condition determination process is explained below with reference to a timing diagram illustrated in FIG. 11.

Figure 11:
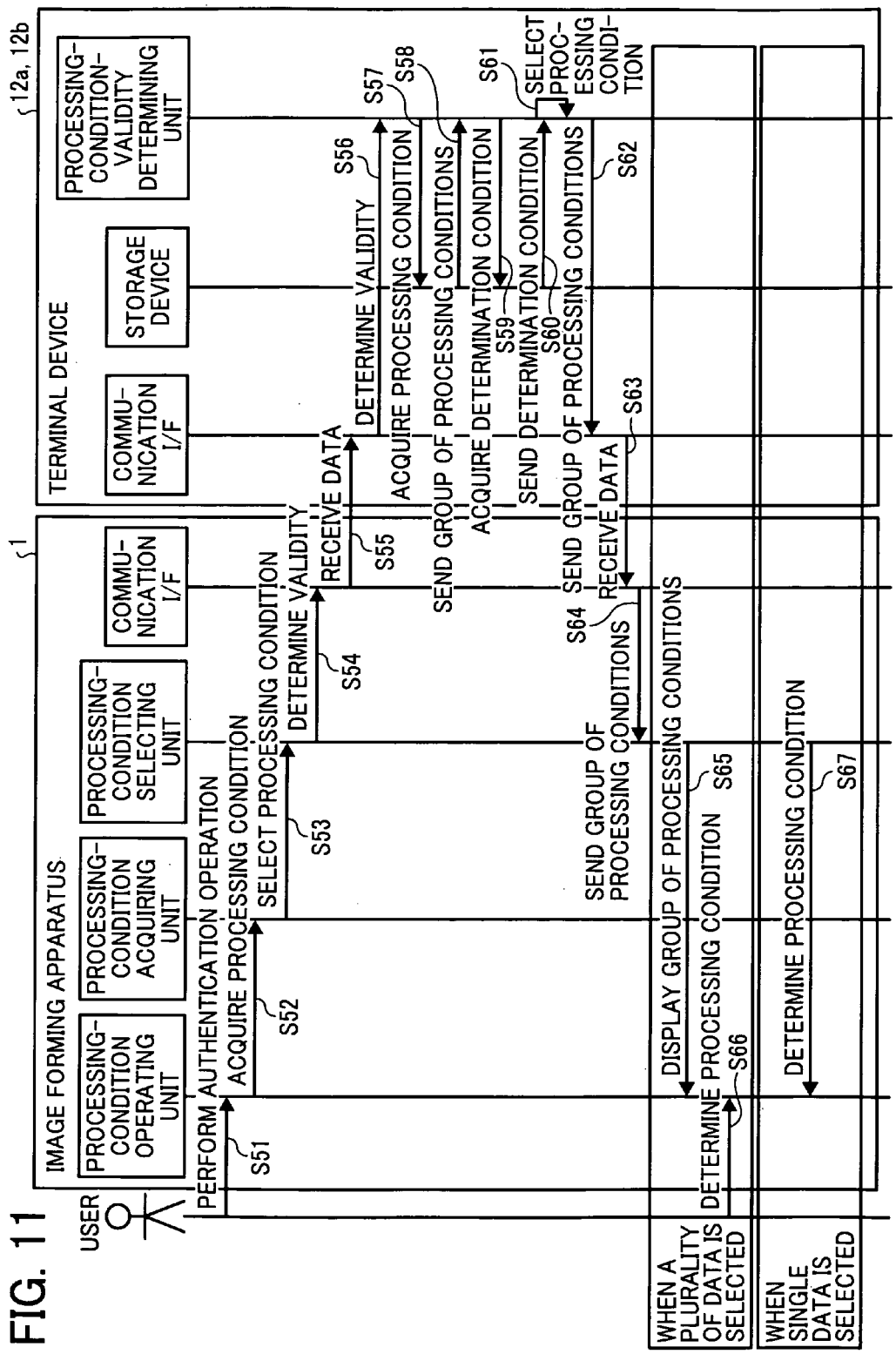
FIG. 11 is a timing diagram illustrating a flow of a processing condition determination process in the embodiment.
Figure 12A:
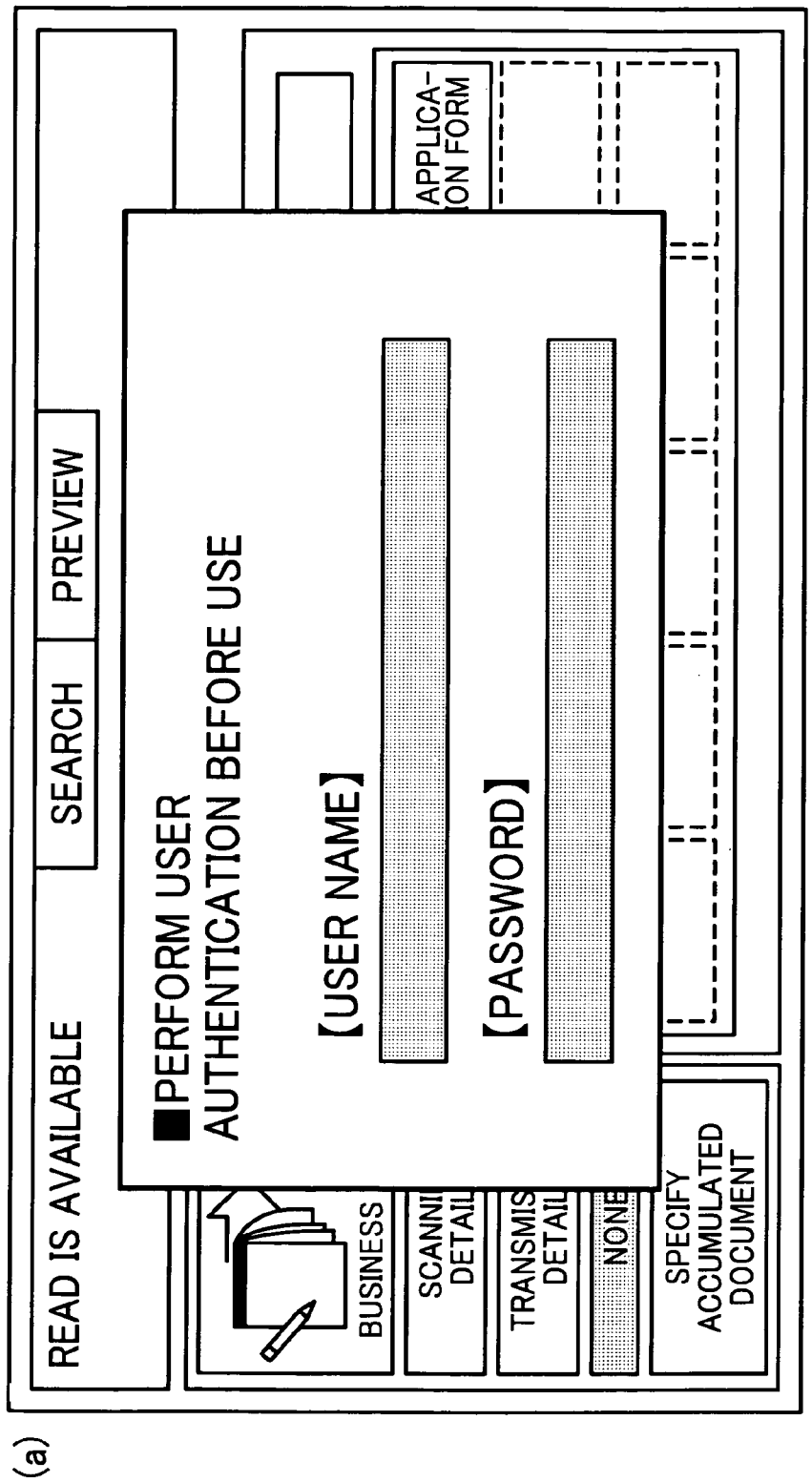

In the timing diagram illustrated in FIG. 11, the process starts at a timing at which a user enters a name and a password in an operation screen as illustrated in FIG. 12A, which is displayed on the operation panel 9, in the process at Step S51, and then the processing condition determination process proceeds to Step S52.

In the process at Step S52, the CPU 2 functions as the processing-condition operating unit 23 to instruct the processing-condition acquiring unit 22 to acquire the processing condition data corresponding to an operational input performed by the user. Accordingly, the process at Step S52 is completed, and the processing condition determination process proceeds to Step S53.

In the process at Step S53, the CPU 2 functions as the processing-condition acquiring unit 22 to request the processing-condition selecting unit 25 to select the processing condition data. Accordingly, the process at Step S53 is completed, and the processing condition determination process proceeds to Step S54.

In the process at Step S54, the CPU 2 functions as the processing-condition selecting unit 25 to request the processing-condition-validity determining unit 24 to determine the validity of the processing condition data based on the validity determination condition data. Accordingly, the process at Step S54 is completed, and the processing condition determination process proceeds to Step S55.

In the process at Step S55, the CPU 2 functions as the processing-condition selecting unit 25 to transmit the name and the password input in the process at Step S51 to the information processing apparatuses 12a and 12b side via the communication I/F 8 by using an e-mail. Accordingly, the process at Step S55 is completed, and the processing condition determination process proceeds to Step S56.

In the process at Step S56, the CPUs of the information processing apparatuses 12a and 12b side send the data of the e-mail transmitted from the image forming apparatus via the communication I/F to the processing-condition-validity determining unit 24. Accordingly, the process at Step S56 is completed, and the processing condition determination process proceeds to Step S57.

In the process at Step S57, the CPUs of the information processing apparatuses 12a and 12b side function as the processing-condition-validity determining unit 24 to issue a request for acquiring the processing condition data stored in the storage unit. Accordingly, the process at Step S57 is completed, and the processing condition determination process proceeds to Step S58.

In the process at Step S58, the storage device sends the processing condition data to the processing-condition-validity determining unit 24. Accordingly, the process at Step S58 is completed, and the processing condition determination process proceeds to Step S59.

In the process at Step S59, the CPUs of the information processing apparatuses 12a and 12b side function as the processing-condition-validity determining unit 24 to issue a request for acquiring the validity determination condition data stored in the storage device. Accordingly, the process at Step S59 is completed, and the processing condition determination process proceeds to Step S60.

In the process at Step S60, the storage device sends the validity determination condition data to the processing-condition-validity determining unit 24. Accordingly, the process at Step S60 is completed, and the processing condition determination process proceeds to Step S61.

In the process at Step S61, the CPUs of the information processing apparatuses 12a and 12b side function as the processing-condition-validity determining unit 24 to select the processing condition data sent by the process at Step S58 based on the validity determination condition data. More specifically, the CPUs of the information processing apparatuses 12a and 12b side determine whether the data of the e-mail sent by the process at Step S56 matches the validity determination condition data illustrated in FIG. 10. When the data matches each other, processing condition data corresponding to the available processing number written in the validity determination condition data is determined to be the processing condition data to be used in the subsequent processes. Accordingly, the process at Step S61 is completed, and the processing condition determination process proceeds to Step S62.

In the process at Step S62, the CPUs of the information processing apparatuses 12a and 12b side transmit the processing condition data obtained by the selecting in the process at Step S61 to the image forming apparatus via the communication I/F by using an e-mail. Accordingly, the process at Step S62 is completed, and the processing condition determination process proceeds to Step S63.

In the process at Step S63, the CPU 2 of the image forming apparatus side stores the processing condition data transmitted from the information processing apparatuses 12a and 12b side via the communication I/F 8. Accordingly, the process at Step S63 is completed, and the processing condition determination process proceeds to Step S64.

In the process at Step S64, the CPU 2 sends the processing condition data received by the process at Step S63 to the processing-condition selecting unit 25. Accordingly, the process at Step S64 is completed. The subsequent processing condition determination process is the same as the processing condition determination process of the first embodiment described above, and therefore, only brief explanation thereof is given below with reference to FIG. 12.

Figure 12B:
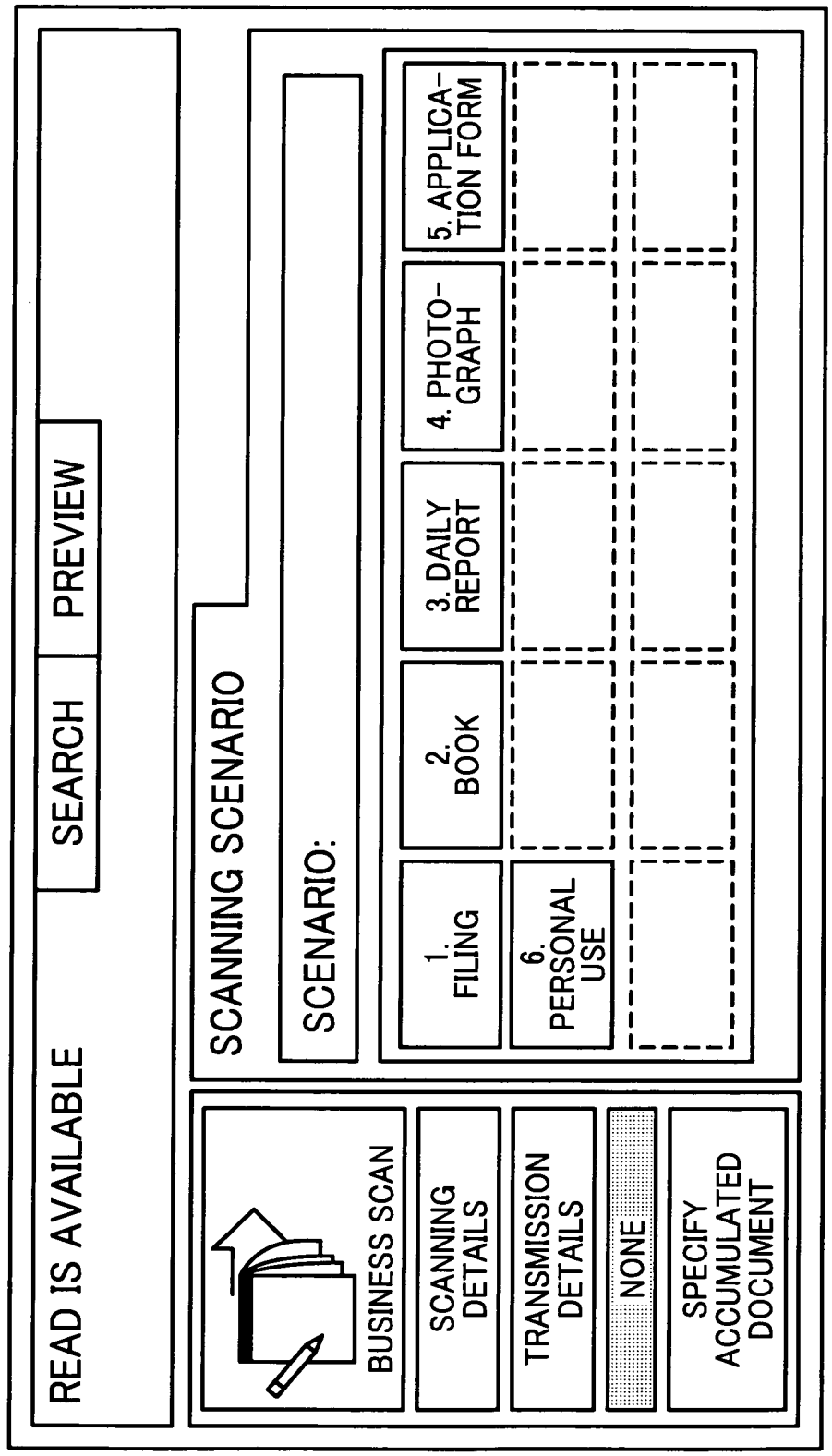
Figure 12C:
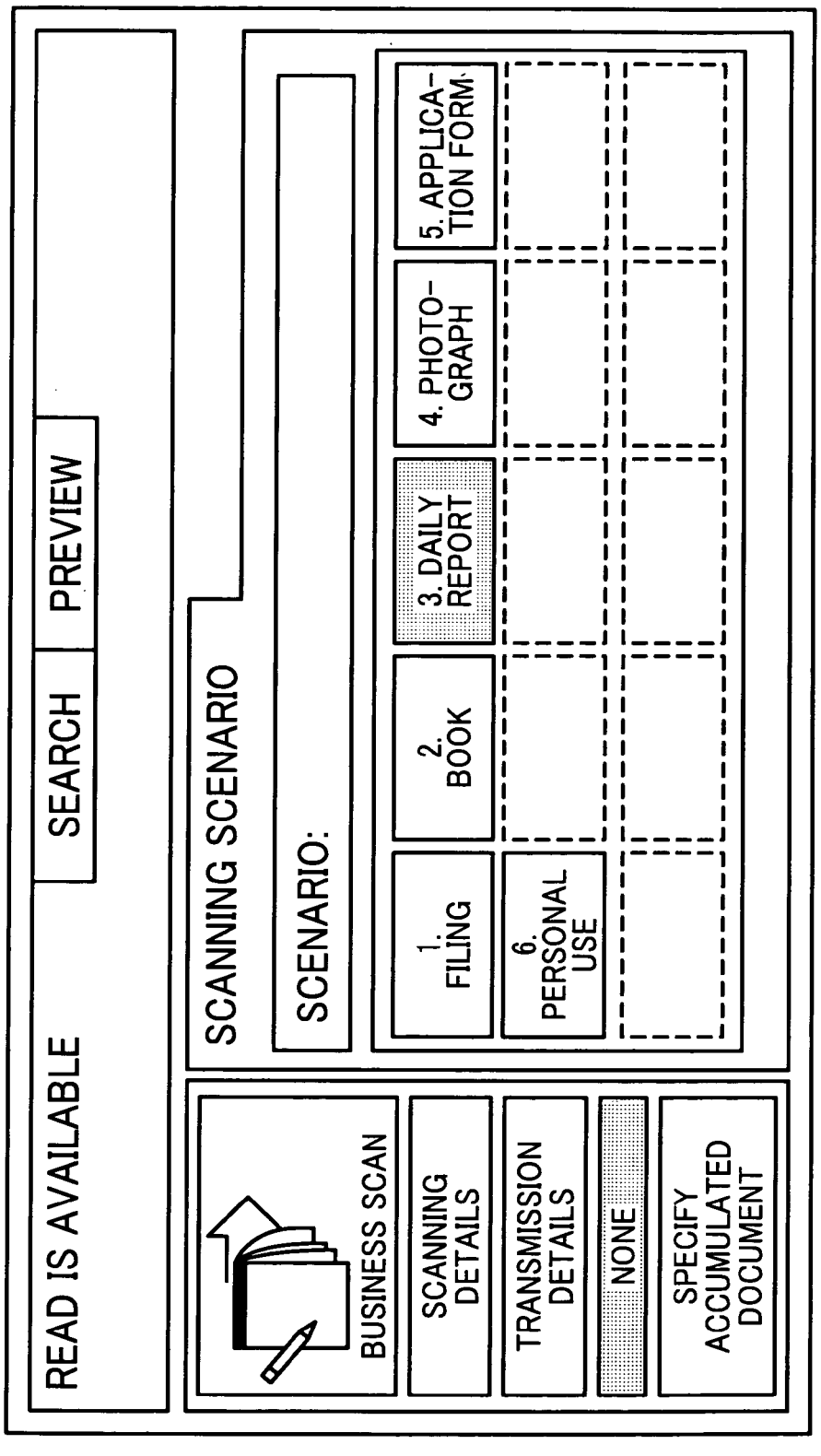

When a plurality of pieces of processing condition data is obtained by the selecting, the CPU 2 displays a list of the pieces of processing condition data as illustrated in FIG. 12B. When a user selects a desired piece of processing condition data (in this example, "daily report") and inputs an instruction to execute a job as illustrated in FIG. 12C, the CPU 2 executes the processing operation as illustrated in FIG. 12F. The above processes correspond to the processes at Steps S65 and S66 illustrated in FIG. 11.

On the other hand, when only a single piece of processing condition data is obtained by the selecting, the CPU 2 displays the selected processing condition as illustrated in FIG. 12D according to the initial setting made by the user, and executes the processing operation as illustrated in FIG. 12F in accordance with an input made by the user for instructing execution of the job. Furthermore, the CPU 2 displays the detailed information on the selected processing condition data as illustrated in FIG. 12E according to the initial setting made by the user, and then executes the processing operation as illustrated in FIG. 12F in accordance with an input made by the user for instructing execution of the job. The above process corresponds to the process at Step S67 illustrated in FIG. 11.

As apparent from the above description, according to the image forming apparatus of the second embodiment, the CPU 2 selects the processing condition to be displayed on the display unit of the operation panel 9 based on whether the processing condition is available to a user or not, and, when a single processing condition is obtained by the selecting, the CPU 2 automatically selects the processing condition as a processing condition to be used in subsequent processes. Therefore, it is possible to reduce the user's labor for instructing execution of image forming operation in accordance with a function setting item.

According to one aspect of the above mentioned embodiments, when only a single function setting item is displayed on a display unit, the function setting item is automatically selected as a function setting item to be executed by an apparatus. Therefore, it is possible to reduce the user's labor for instructing execution of operation in accordance with the function setting item.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
   a storage unit configured to store therein a plurality of function setting items, each indicating a process executed by the image forming apparatus;
   a selecting unit configured to select one or more function setting items from the plurality of function setting items stored in the storage unit based on a set condition according to an input from a user;
   a determining unit configured to determine whether the number of the function setting item selected by the selecting unit is one or two or more;
   a displaying unit configured to display, when the determining unit determines that the number of the function setting items is two or more, the two or more function setting items;
   a receiving unit configured to receive a selection of one function setting item from the two or more function setting items that are displayed by the displaying unit; and
   a control unit configured to cause the image forming apparatus to execute a process indicated by the selected one function setting item that is received by the receiving unit, wherein
   when the determining unit determines that the number of the function setting item is one, the control unit causes the image forming apparatus to execute a process indicated by the one function setting unit without receiving a selection of a function setting item at the receiving unit.

2. The image forming apparatus according to claim 1, wherein the storage unit stores therein, in associated with each user, one or more function setting items each indicating a process available by the user, and
   the selecting unit selects, according to an input of identification information for identifying a user, one or more function setting items that are stored in the storage unit in associated with the user who is identified by the identification information.

3. The image forming apparatus according to claim 2, further comprising a switching unit configured to switch between a first mode and a second mode, wherein
   the first mode is a mode in which, when the determining unit determines that the number of the function setting item is one, the display unit displays details of the one function setting item, and
   the second mode is a mode in which when the determining unit determines that the number of the function setting item is one, the control unit causes the image forming apparatus to execute a process indicated by the one function setting item.

4. The image forming apparatus according to claim 1, wherein when the determining unit determines that the number of the function setting item is one, the display unit displays details of the one function setting item.

5. The image forming apparatus according to claim 1, wherein
   the set condition indicates a process executable by the image forming apparatus, and
   the selecting unit selects one or more function setting items executable by the image forming apparatus from the plurality of function setting items stored in the storage unit.

6. A method of operating an image forming apparatus, comprising:
   storing, via a storage unit, a plurality of function setting items, each indicating a process executed by the image forming apparatus;

selecting, via a selecting unit, one or more function setting items from the plurality of function setting items stored in the storage unit based on a set condition according to an input from a user;

determining, via a determining unit, whether the number of the function setting item selected by the selecting unit is one or two or more;

displaying, via a displaying unit, when the determining unit determines that the number of the function setting items is two or more, the two or more function setting items;

receiving, via a receiving unit, a selection of one function setting item from the two or more function setting items that are displayed by the displaying unit; and controlling, via a control unit, the image forming apparatus to execute a process indicated by the selected one function setting item that is received by the receiving unit, wherein when the determining unit determines that the number of the function setting item is one, the control unit causes the image forming apparatus to execute a process indicated by the one function setting unit without receiving a selection of a function setting item at the receiving unit.

7. The method according to claim 6, wherein the storage unit stores therein, in associated with each user, one or more function setting items each indicating a process available by the user, and the selecting unit selects, according to an input of identification information for identifying a user, one or more function setting items that are stored in the storage unit in associated with the user who is identified by the identification information.

8. The method according to claim 6, wherein when the determining unit determines that the number of the function setting item is one, the display unit displays details of the one function setting item.

9. The method according to claim 8, further comprising a switching unit configured to switch between a first mode and a second mode, wherein the first mode is a mode in which, when the determining unit determines that the number of the function setting item is one, the display unit displays details of the one function setting item, and the second mode is a mode in which when the determining unit determines that the number of the function setting item is one, the control unit causes the image forming apparatus to execute a process indicated by the one function setting item.

10. The method according to claim 6, wherein the set condition indicates a process executable by the image forming apparatus, and the selecting unit selects one or more function setting items executable by the image forming apparatus from the plurality of function setting items stored in the storage unit.

11. A computer program product comprising a non-transitory computer usable medium having computer readable program codes embodied in the medium that, when executed, causes a computer to execute:

storing, via a storage unit, a plurality of function setting items, each indicating a process executed by the image forming apparatus;

selecting, via a selecting unit, one or more function setting items from the plurality of function setting items stored in the storage unit based on a set condition according to an input from a user;

determining, via a determining unit, whether the number of the function setting item selected by the selecting unit is one or two or more;

displaying, via a displaying unit, when the determining unit determines that the number of the function setting items is two or more, the two or more function setting items;

receiving, via a receiving unit, a selection of one function setting item from the two or more function setting items that are displayed by the displaying unit; and controlling, via a control unit, the image forming apparatus to execute a process indicated by the selected one function setting item that is received by the receiving unit, wherein when the determining unit determines that the number of the function setting item is one, the control unit causes the image forming apparatus to execute a process indicated by the one function setting unit without receiving a selection of a function setting item at the receiving unit.

* * * * *